（12) United States Patent
Maynard et al.

(10) Patent No.: US 11,802,736 B2
(45) Date of Patent: Oct. 31, 2023

(54) ANNULAR HEAT EXCHANGER

(71) Applicant: Hamilton Sundstrand Corporation, Charlotte, NC (US)

(72) Inventors: Michael Maynard, Somers, CT (US); Donald E. Army, Enfield, CT (US); Anthony DeLugan, Westfield, MA (US); Ephraim Joseph, Vernon, CT (US); Seth E. Rosen, Middletown, CT (US); David Saltzman, Glastonbury, CT (US); Christopher Testa, Ringoes, NJ (US); John H. Whiton, South Windsor, CT (US); Sebastian Zuraw, Opole (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/383,064

(22) Filed: Jul. 22, 2021

(65) Prior Publication Data

US 2022/0034592 A1  Feb. 3, 2022

Related U.S. Application Data

(60) Provisional application No. 63/196,504, filed on Jun. 3, 2021, provisional application No. 63/058,034, filed
(Continued)

(51) Int. Cl.
*F28D 7/00* (2006.01)
*F28F 9/02* (2006.01)
(Continued)

(52) U.S. Cl.
CPC ............. *F28D 7/0008* (2013.01); *F28F 7/02* (2013.01); *F28F 9/0248* (2013.01); *F28F 13/08* (2013.01);
(Continued)

(58) Field of Classification Search
CPC .. F28D 9/0018; F28D 2021/0021; F28F 7/02; F02C 7/08; F02C 7/10; B33Y 80/00; B64D 13/06
See application file for complete search history.

(56) References Cited

U.S. PATENT DOCUMENTS 2,958,211 A * 11/1960 Griffith ................. B64D 13/08
62/402
3,208,234 A   9/1965 Messinger
(Continued)

FOREIGN PATENT DOCUMENTS

DE   102007044980 A1   3/2008
EP       3193116 A1   7/2017
(Continued)

OTHER PUBLICATIONS

Extended European Search Report dated May 17, 2017 in connection with EP Publication No. 16207348, 7 pages.
(Continued)

*Primary Examiner* — Eric S Ruppert
(74) *Attorney, Agent, or Firm* — Kinney & Lange, P.A.

(57) ABSTRACT

A heat exchanger includes a header and an annular core fluidly connected to the header. The annular core includes an inner diameter, an outer diameter, first flow channels arranged in a first set of layers, and second flow channels arranged in a second set of layers and interleaved with the first flow channels. Each of the first flow channels includes a first inlet, a first outlet, and a first axial region extending between the first inlet and the first outlet. Each of the second flow channels includes a second inlet, a second outlet, and a second axial region extending between the second inlet and the second outlet.

20 Claims, 7 Drawing Sheets

Related U.S. Application Data on Jul. 29, 2020, provisional application No. 63/058,127, filed on Jul. 29, 2020.

(51) Int. Cl.
| | |
|---|---|
| *F28F 13/08* | (2006.01) |
| *F28F 21/08* | (2006.01) |
| *F28F 7/02* | (2006.01) |
| *B64D 13/06* | (2006.01) |
| *F25B 39/04* | (2006.01) |

(52) U.S. Cl.
CPC ............ *F28F 21/084* (2013.01); *B64D 13/06* (2013.01); *B64D 2013/0603* (2013.01); *F25B 39/04* (2013.01); *F28F 2009/0287* (2013.01); *F28F 2250/106* (2013.01); *F28F 2255/00* (2013.01); *F28F 2275/06* (2013.01)

(56) References Cited

U.S. PATENT DOCUMENTS

| | | | |
|---|---|---|---|
| 3,323,586 A | 6/1967 | Burne et al. | |
| 3,362,155 A | 1/1968 | Edward | |
| 3,493,041 A | 2/1970 | Hourwitz et al. | |
| 3,501,900 A | 3/1970 | Warner et al. | |
| 4,305,458 A | 12/1981 | Jogand | |
| 4,357,991 A | 11/1982 | Cameron | |
| 4,438,809 A * | 3/1984 | Papis ................. | F28D 9/0018 |
| | | | 165/166 |
| 4,469,078 A | 9/1984 | Speer et al. | |
| 4,609,039 A | 9/1986 | Fushiki et al. | |
| 4,681,610 A | 7/1987 | Warner | |
| 4,769,050 A | 9/1988 | Shaw et al. | |
| 4,898,234 A | 2/1990 | McGovern et al. | |
| 5,002,123 A | 3/1991 | Nelson et al. | |
| 5,242,015 A | 9/1993 | Saperstein et al. | |
| 6,460,353 B2 | 10/2002 | Udobot et al. | |
| 7,111,673 B2 | 9/2006 | Hugill | |
| 7,285,153 B2 | 10/2007 | Bruun et al. | |
| 7,496,285 B2 | 2/2009 | Molavi | |
| 7,661,460 B1 | 2/2010 | Cowans et al. | |
| 7,691,185 B2 | 4/2010 | Darke et al. | |
| 7,871,578 B2 | 1/2011 | Schmidt | |
| 7,931,720 B2 | 4/2011 | Stucki | |
| 8,235,101 B2 | 8/2012 | Taras et al. | |
| 8,289,710 B2 | 10/2012 | Spearing et al. | |
| 8,425,641 B2 | 4/2013 | Chaudhari et al. | |
| 9,010,405 B1 | 4/2015 | Bharathan et al. | |
| 9,134,072 B2 | 9/2015 | Roisin et al. | |
| 9,200,855 B2 | 12/2015 | Kington et al. | |
| 9,452,840 B2 | 9/2016 | Lyons et al. | |
| 10,088,250 B2 | 10/2018 | Turney | |
| 10,322,621 B2 | 6/2019 | Army | |
| 10,385,809 B2 | 8/2019 | Prociw | |
| 10,443,436 B2 | 10/2019 | Miller et al. | |
| 10,539,377 B2 | 1/2020 | Turney et al. | |
| 10,562,636 B2 | 2/2020 | Peacos et al. | |
| 10,584,922 B2 | 3/2020 | Herring et al. | |
| 10,633,099 B2 | 4/2020 | Walsh et al. | |
| 10,670,349 B2 | 6/2020 | Wilson et al. | |
| 10,816,282 B2 | 10/2020 | Turney et al. | |
| 10,921,071 B2 | 2/2021 | Turney | |
| 11,112,183 B2 | 9/2021 | Turney et al. | |
| 11,168,942 B2 | 11/2021 | Becene et al. | |
| 2001/0025506 A1 | 10/2001 | Buchholz et al. | |
| 2002/0121103 A1 | 9/2002 | Udobot et al. | |
| 2003/0173720 A1 | 9/2003 | Musso et al. | |
| 2004/0118389 A1 | 6/2004 | Shaffer et al. | |
| 2004/0258587 A1 | 12/2004 | Bowe et al. | |
| 2006/0021356 A1 | 2/2006 | Milde et al. | |
| 2008/0040984 A1 | 2/2008 | Lanahan | |
| 2009/0260586 A1 | 10/2009 | Geskes et al. | |
| 2010/0300666 A1 | 12/2010 | Hislop et al. | |
| 2011/0073716 A1 | 3/2011 | Klimpel | |
| 2011/0232885 A1 | 9/2011 | Kaslusky et al. | |
| 2011/0259546 A1 | 10/2011 | Defrancesco et al. | |
| 2012/0285660 A1 | 11/2012 | Poltorak | |
| 2013/0097996 A1 | 4/2013 | Rosen et al. | |
| 2013/0206374 A1 | 8/2013 | Roisin et al. | |
| 2014/0174703 A1 | 6/2014 | Yoshioka et al. | |
| 2014/0284038 A1 | 9/2014 | Vedula et al. | |
| 2014/0345837 A1 | 11/2014 | Alahyari et al. | |
| 2015/0292743 A1 | 10/2015 | Mook et al. | |
| 2016/0123230 A1 | 5/2016 | Thomas | |
| 2016/0202003 A1 | 7/2016 | Gerstler et al. | |
| 2016/0230595 A1 | 8/2016 | Wong et al. | |
| 2016/0231071 A1 | 8/2016 | Sekol et al. | |
| 2017/0146305 A1 | 5/2017 | Kuczek et al. | |
| 2017/0159565 A1 | 6/2017 | Evulet | |
| 2017/0191762 A1 | 7/2017 | Duesler et al. | |
| 2017/0198976 A1 * | 7/2017 | Turney ..................... | F28F 7/02 |
| 2017/0198977 A1 | 7/2017 | Herring et al. | |
| 2017/0198978 A1 | 7/2017 | Kuczek et al. | |
| 2017/0198979 A1 | 7/2017 | St. Rock et al. | |
| 2017/0198988 A1 | 7/2017 | Herring | |
| 2017/0198990 A1 | 7/2017 | Turney | |
| 2017/0205146 A1 | 7/2017 | Turney et al. | |
| 2017/0205149 A1 | 7/2017 | Herring et al. | |
| 2017/0205156 A1 | 7/2017 | Ranjan et al. | |
| 2017/0233083 A1 | 8/2017 | Behrens et al. | |
| 2017/0248372 A1 | 8/2017 | Erno et al. | |
| 2017/0276441 A1 | 9/2017 | Kuczek et al. | |
| 2017/0363361 A1 | 12/2017 | Turney | |
| 2018/0112932 A1 | 4/2018 | Turney et al. | |
| 2018/0195813 A1 | 7/2018 | Turney et al. | |
| 2018/0229586 A1 | 8/2018 | Army | |
| 2018/0238627 A1 | 8/2018 | Herring et al. | |
| 2018/0291925 A1 | 10/2018 | Chrabascz et al. | |
| 2018/0354626 A1 | 12/2018 | Himmelmann | |
| 2019/0011199 A1 | 1/2019 | Turney | |
| 2019/0054406 A1 | 2/2019 | Johnson et al. | |
| 2019/0056113 A1 | 2/2019 | Mook et al. | |
| 2019/0186361 A1 | 6/2019 | Gerstler et al. | |
| 2019/0388818 A1 | 12/2019 | Martin et al. | |
| 2020/0041212 A1 | 2/2020 | Palmer et al. | |
| 2020/0080798 A1 | 3/2020 | Turney et al. | |
| 2020/0108937 A1 | 4/2020 | Behrens et al. | |
| 2020/0147535 A1 | 5/2020 | Hoerr et al. | |
| 2020/0166293 A1 | 5/2020 | Turney et al. | |
| 2020/0172252 A1 | 6/2020 | Beckman et al. | |
| 2020/0173365 A1 | 6/2020 | Roberge | |
| 2020/0179851 A1 | 6/2020 | Palmer | |
| 2020/0277919 A1 | 9/2020 | Suzuki et al. | |
| 2020/0284516 A1 | 9/2020 | Becene et al. | |
| 2020/0284531 A1 | 9/2020 | Maynard et al. | |
| 2020/0384398 A1 | 12/2020 | Scheckel et al. | |
| 2021/0102756 A1 | 4/2021 | Becene et al. | |
| 2021/0291095 A1 | 9/2021 | Peterson et al. | |
| 2022/0032219 A1 | 2/2022 | Army et al. | |
| 2022/0194600 A1 | 6/2022 | Army et al. | |
| 2022/0381521 A1 | 12/2022 | Heminger et al. | |

FOREIGN PATENT DOCUMENTS

| | | | |
|---|---|---|---|
| EP | 3193118 A1 | 7/2017 | |
| EP | 3367038 A1 | 8/2018 | |
| EP | 3425318 A1 | 1/2019 | |
| FR | 2395480 A2 | 1/1979 | |
| GB | 768975 A | 2/1957 | |
| GB | 996166 A | 6/1965 | |
| GB | 1032990 A | 6/1966 | |
| GB | 2521913 A | 7/2015 | |
| JP | 2006098035 A | * | 4/2006 |
| SK | 1222014 U1 | 3/2015 | |
| WO | 2017008108 A1 | 1/2017 | |
| WO | 2020046603 A1 | 3/2020 | |

OTHER PUBLICATIONS

Extended European Search Report dated Nov. 27, 2018 in connection with EP Publication No. 18191192, 11 pages.
Extended European Search Report dated Jun. 26, 2018 in connection with EP Publication No. 18156907, 6 pages.

(56) References Cited

OTHER PUBLICATIONS

Extended European Search Report dated Nov. 25, 2021 in connection with EP Publication No. 21188585, 7 pages.
Partial European Search Report dated Dec. 20, 2021 in connection with EP Application No. 21188600.7, 11 pages.
Extended European Search Report dated Apr. 13, 2022 in connection with EP Application No. 21188600.7, 11 pages.
Extended European Search Report dated Dec. 10, 2017 in connection with EP Application No. 21182914.8, 7 pages.

* cited by examiner

ANNULAR HEAT EXCHANGER

CROSS-REFERENCE TO RELATED APPLICATION(S)

This application claims the benefit of U.S. Provisional Application No. 63/058,034 filed Jul. 29, 2020, for "ANNULAR HEAT EXCHANGER," which is fully incorporated by reference herein. This application also claims the benefit of U.S. Provisional Application No. 63/058,127 filed Jul. 29, 2020, which is fully incorporated by reference herein. This application also claims the benefit of U.S. Provisional Application No. 63/196,504 filed Jun. 3, 2021, which is fully incorporated by reference herein.

BACKGROUND

This disclosure relates generally to heat exchangers, and more specifically to annular heat exchangers.

Heat exchangers are well known in many industries for a variety of applications. In mobile applications, particularly for aerospace applications, heat exchangers provide a highly effective means of exchanging heat from a hot fluid to a cold fluid. For example, heat exchangers can be components of an aircraft environmental control system (ECS). ECSs supply conditioned air to an enclosure, such as an aircraft cabin. One type of ECS can include an air cycle machine (ACM). Conventional ACMs include a fan, a compressor, and two turbines co-located on a single rotatable shaft. This rotative assembly can be associated with other static structures and components in the ECS.

In an ECS, fluid flows are typically delivered to and distributed from heat exchangers, which requires numerous pneumatic ducts and couplings. Each separate duct and coupling can add volume and weight to the system.

SUMMARY

In one example, a heat exchanger includes a header and an annular core fluidly connected to the header. The annular core includes an inner diameter defining an inner face, an outer diameter defining an outer face, first flow channels arranged in a first set of layers between the inner diameter and the outer diameter, and second flow channels arranged in a second set of layers between the inner diameter and the outer diameter and interleaved with the first flow channels. Each of the first flow channels includes a first inlet, a first outlet, and a first axial region extending between the first inlet and the first outlet. Each of the second flow channels includes a second inlet, a second outlet, and a second axial region extending between the second inlet and the second outlet.

In another example, a method includes constructing an annular heat exchanger core as a single, monolithic unit utilizing an additive manufacturing process, constructing a heat exchanger header, and connecting the header to the annular core to form a heat exchanger. The annular core includes an inner diameter defining an inner face, an outer diameter defining an outer face, first flow channels arranged in a first set of layers between the inner diameter and the outer diameter, and second flow channels arranged in a second set of layers between the inner diameter and the outer diameter and interleaved with the first flow channels. Each of the first flow channels includes a first inlet, a first outlet, and a first axial region extending between the first inlet and the first outlet. Each of the second flow channels includes a second inlet, a second outlet, and a second axial region extending between the second inlet and the second outlet.

DETAILED DESCRIPTION

An annular heat exchanger with contoured hexagonal flow channels is disclosed herein. The contoured hexagonal flow channel geometry enables the annular configuration of the heat exchanger. Furthermore, the annular heat exchanger can connect more directly to other components. The annular heat exchanger is described below with reference to FIGS. 1-5B.

Figure 1:
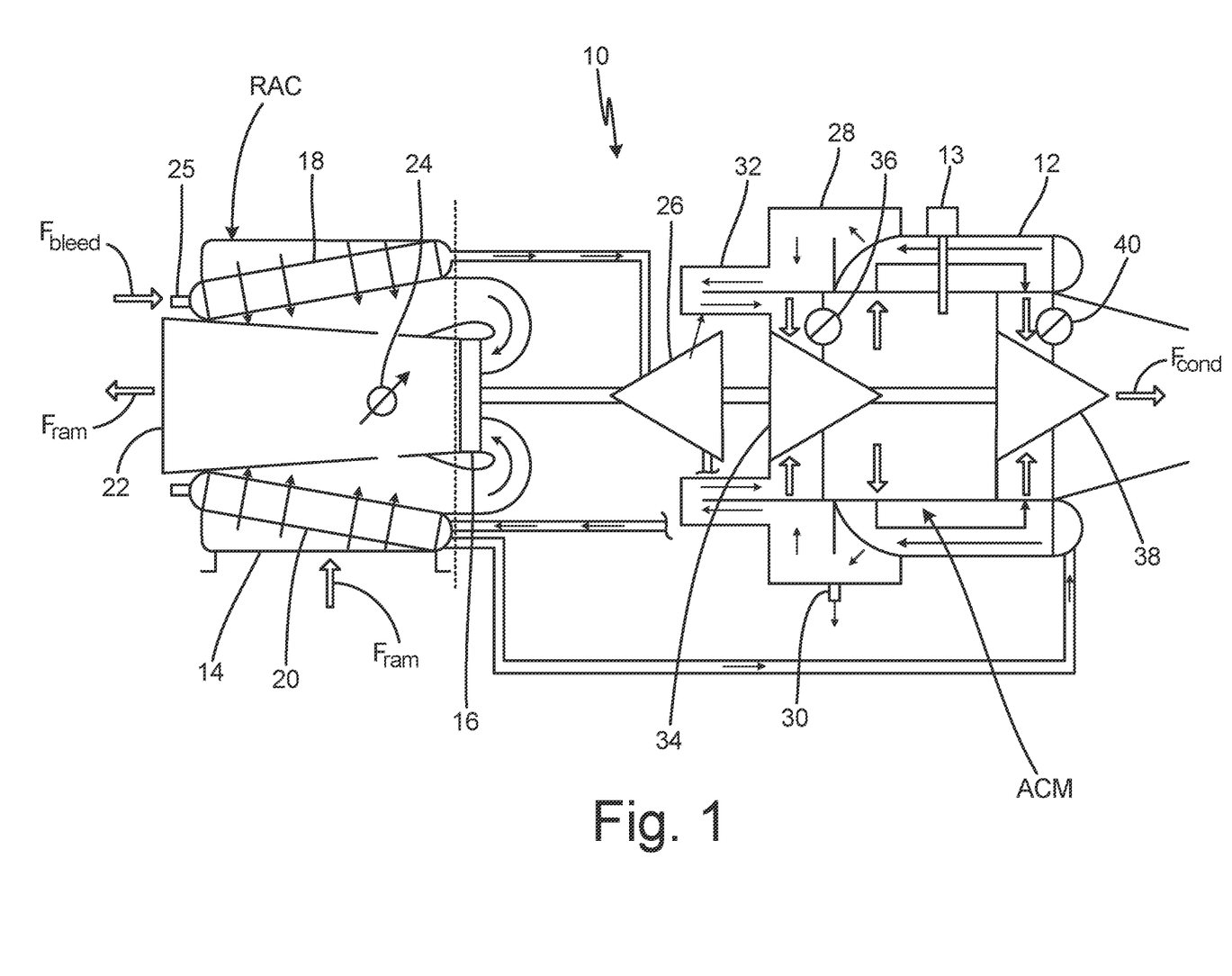
FIG. 1 is a schematic diagram of an environmental control system including an annular heat exchanger.

FIG. 1 is a schematic diagram of environmental control system 10 including annular heat exchanger 12. Environmental control system 10 includes annular heat exchanger 12 (including sensor 13), ram intake 14, fan 16, primary heat exchanger 18, secondary heat exchanger 20, ram exhaust 22, ejector 24, bleed inlet 25, compressor 26, water collector 28, water collector drain port 30, pre-heater 32, first turbine 34, first turbine bypass 36, second turbine 38, and second turbine bypass 40. Fan 16, compressor 26, first turbine 34, and second turbine 38 can define air cycle machine (ACM). Environmental control system 10 interacts with ram airflow $F_{ram}$ and bleed airflow $F_{bleed}$. Environmental control system 10 supplies pressurized conditioned airflow $F_{cond}$ to an enclosure.

Ram intake 14, fan 16, primary heat exchanger 18, secondary heat exchanger 20, and ram exhaust 22 define a ram air circuit (RAC). Ram air circuit RAC can be contained in a housing (as illustrated schematically in FIG. 1 by the outline at ram air circuit RAC). Ram intake 14 is an opening located upstream of fan 16 and ram exhaust 22. Ram exhaust 22 is a downstream outlet. Each of ram intake 14 and ram exhaust 22 can be open to the ambient air (or ram air). Ram intake 14 is fluidly connected to primary heat exchanger 18 and secondary heat exchanger 20, which can operate in parallel.

Bleed inlet 25 is connected to an aircraft bleed air system (not shown in FIG. 1) and opens into primary heat exchanger 18. Compressor 26 is located downstream of primary heat exchanger 18. Primary heat exchanger 18 is fluidly connected to compressor 26. Compressor 26 is fluidly connected to secondary heat exchanger 20 downstream of primary heat exchanger 18. Secondary heat exchanger 20 is fluidly connected to annular heat exchanger 12 downstream of compressor 26.

Fan 16, compressor 26, first turbine 34, and second turbine 38 define air cycle machine ACM. Air cycle machine ACM is located adjacent to ram air circuit RAC within environmental control system 10. Fan 16 of air cycle machine ACM is connected to ram air circuit RAC. Fan 16, compressor 26, first turbine 34, and second turbine 38 can be rotatably connected to a single shaft extending within environmental control system 10. Though the embodiment shown in FIG. 1 includes both first turbine 34 and second turbine 38, it should be understood that alternative embodiments can be configured to include only a single turbine (e.g., one of first turbine 34). As shown in FIG. 1, first turbine 34 and second turbine 38 can be arranged in series, such that second turbine 38 is located downstream of first turbine 34. First turbine 34 and second turbine 38 can also be contained within a housing.

Annular heat exchanger 12, water collector 28, and pre-heater 32 can each be annular and configured to surround air cycle machine ACM or individual components of air cycle machine ACM, such that walls of annular heat exchanger 12, water collector 28, and pre-heater 32 can form part of a structure or housing of air cycle machine ACM. For example, annular heat exchanger 12 can surround first turbine 34 and second turbine 38, such that annular heat exchanger 12 mates with or is directly integrated with a radial interface of a housing (as illustrated schematically in FIG. 1 by the outline at air cycle machine ACM) of first turbine 34 and second turbine 38. Pre-heater 32 can surround compressor 26. Water collector 28 can surround an end of annular heat exchanger 12 proximate pre-heater 32 and first turbine 34. Annular heat exchanger 12, water collector 28, and pre-heater 32 can be arranged in serial fluid connection (as illustrated by the flow arrows in FIG. 1).

Sensor 13 can be an external component associated with annular heat exchanger 12. Specifically, sensor 13 can be a temperature sensor. Annular heat exchanger 12 can define a well or passage so that sensor 13 can extend through annular heat exchanger 12. Sensor 13 is illustrated schematically in FIG. 1 as being externally accessible and extending through annular heat exchanger 12 into a region within air cycle machine ACM downstream of first turbine 34.

Water collector drain port 30 is connected to a relatively lowest portion or plenum of water collector 28 (e.g., a sump). Water collector drain port 30 is plumbed to spray collected moisture into ram airflow $F_{ram}$ across secondary heat exchanger 20. Thus, water collector drain port 30 can be connected to a spray nozzle, for example, a spray nozzle installed in a duct for supplying ram airflow $F_{ram}$ to ram intake 14, or any other suitable means of spraying collected moisture.

In operation, bleed airflow $F_{bleed}$ is received from a gas turbine engine (not shown in FIG. 1). Bleed airflow $F_{bleed}$ can be initially around 400 degrees Fahrenheit (400° F.). Bleed airflow $F_{bleed}$ is sent through primary heat exchanger 18, such that bleed airflow $F_{bleed}$ is in a heat exchange relationship with ram airflow $F_{ram}$. Primary heat exchanger 18 can be an air-to-air heat exchanger. During aircraft flight, ram airflow $F_{ram}$ is forced into ram intake 14 to flow through secondary heat exchanger 20 and around to a backside plenum of ram air circuit RAC through primary heat exchanger 18. Ejector 24 simulates a bypass of fan 16. On the ground, fan 16 pulls ram airflow $F_{ram}$ from ram intake 14 and through primary heat exchanger 18 and secondary heat exchanger 20. Ram airflow $F_{ram}$ is expelled overboard from ram air circuit RAC via ram exhaust 22.

After bleed airflow $F_{bleed}$ is cooled in primary heat exchanger 18 (to around 200° F.), the resulting cooler air is communicated to compressor 26, where the air is compressed to a higher pressure. Compressed air exits compressor 26 and is communicated to secondary heat exchanger 20. Secondary heat exchanger 20 can also be an air-to-air heat exchanger. Secondary heat exchanger 20 further cools the compressed air via heat exchange with ram airflow $F_{ram}$ from ram intake 14.

Figure 2A:
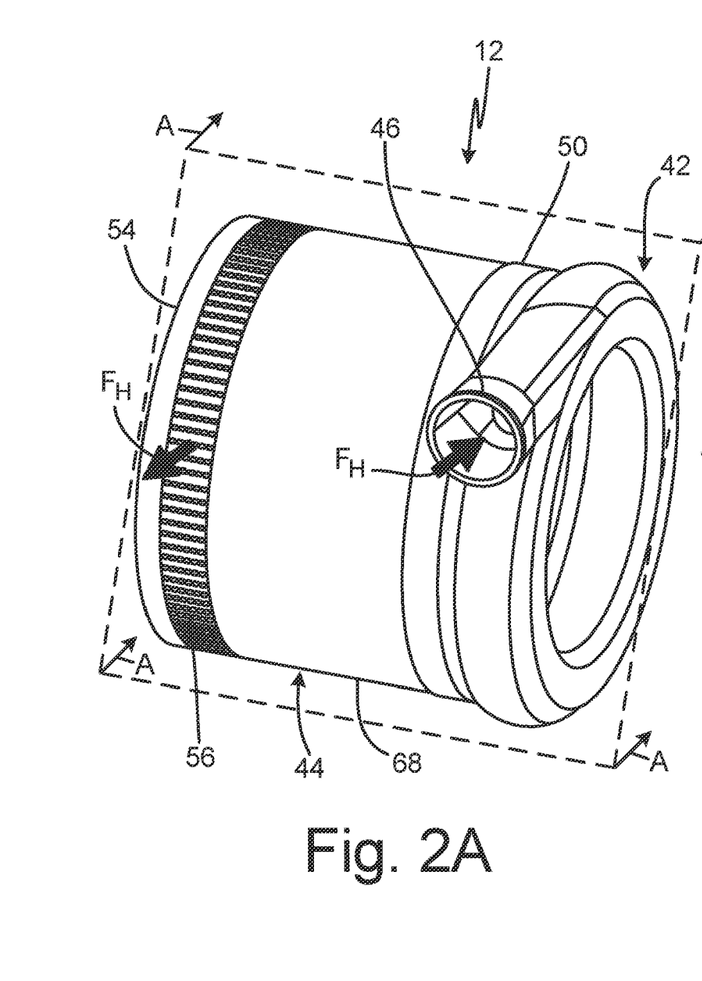
FIG. 2A is a front isometric view of an annular heat exchanger.

Compressed, cooled, and moisture-bearing air exits secondary heat exchanger 20 and is communicated to a hot flow path (for hot fluid $F_H$, as shown in FIG. 2A) of annular heat exchanger 12. Annular heat exchanger 12 can also be an air-to-air heat exchanger. Annular heat exchanger 12 can further cool the moisture-bearing air, such that condensation from the air can be collected in water collector 28. Condensation accumulates in water collector 28 and is directed within water collector 28 to water collector drain port 30. Water collector drain port 30 is plumbed to spray the moisture collected in water collector 28 into the ram air circuit RAC (not shown in FIG. 1) at secondary heat exchanger 20 to provide additional evaporative cooling.

Dehumidified air is communicated from water collector 28 through pre-heater 32, where the air recovers some heat from compressor 26 prior to entering first turbine 34. The air is expanded through first turbine 34 of air cycle machine ACM. The air that is discharged from first turbine 34 is maintained at a discharge temperature just above freezing. First turbine bypass 36 can be a valve or the like configured to regulate the temperature of the output air from first turbine 34 by permitting some air to bypass first turbine 34 (e.g., to maintain first turbine output air at approximately 34° F.). First turbine bypass 36 functions in concert with sensor 13, which can be in contact with the output air from first turbine 34 to sense temperature.

Cooled output air from first turbine 34 is passed through a cold flow path of annular heat exchanger 12 (FIG. 2B) to provide heat exchange with the air from secondary heat exchanger 20. This output air also causes moisture to condense out of the air from secondary heat exchanger 20. The air from first turbine 34 exits annular heat exchanger 12 and can be communicated directly to second turbine 38. The air is expanded through second turbine 38 and discharged to pressurize and provide conditioned airflow $F_{cond}$ to an enclosure, such as an aircraft cabin. Second turbine bypass 40 functions similarly to first turbine bypass to regulate the temperature of the output air from second turbine 38 by permitting some air to bypass second turbine 38. First turbine bypass 36 and second turbine bypass 40 can be opened or closed depending on external air temperature conditions.

Environmental control system 10 as described herein has decreased volume and assembly weight compared to conventional systems. Specifically, the annular configuration of annular heat exchanger 12 enables annular heat exchanger 12 to mate with or be integrated directly with the radial surfaces of other cylindrical components (e.g., water collector 28, first turbine 34, second turbine 38, and any other cylindrical components, such as rotating machines and additional heat exchangers). This configuration enables distributed flow to be ported directly into or out of mating component plenums with minimal need for additional collector plenums, external ducts, or couplings between annular heat exchanger 12 and other components of environmental control system 10. Therefore, system assembly weight and volume can be reduced. Furthermore, pressure losses (i.e., pressure drop) between mated components can be reduced.

The annular configuration of annular heat exchanger 12 further allows annular heat exchanger 12 to provide a portion of the containment structure for air cycle machine ACM. Therefore, annular heat exchanger 12 can also aid in containing failure modes of rotating machines, such as first turbine 34 and second turbine 38. The additional material provided around air cycle machine ACM by annular heat exchanger 12 can reduce the internal containment weight of air cycle machine ACM.

Figure 2B:
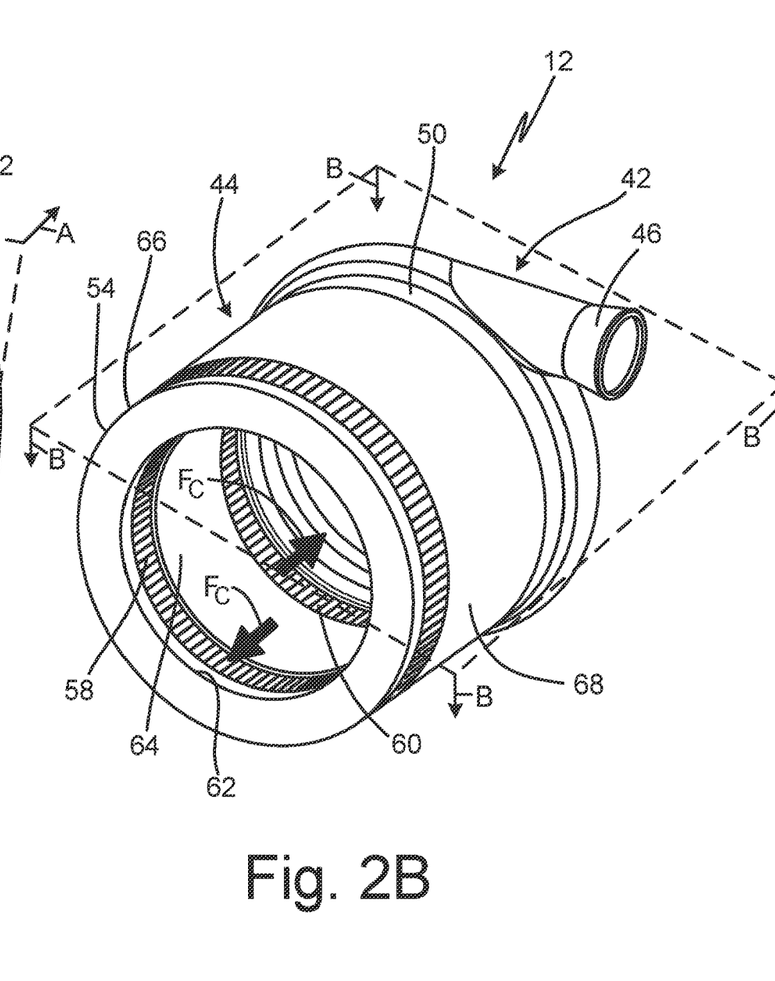
FIG. 2B is a rear isometric view of an annular heat exchanger.
Figure 3:
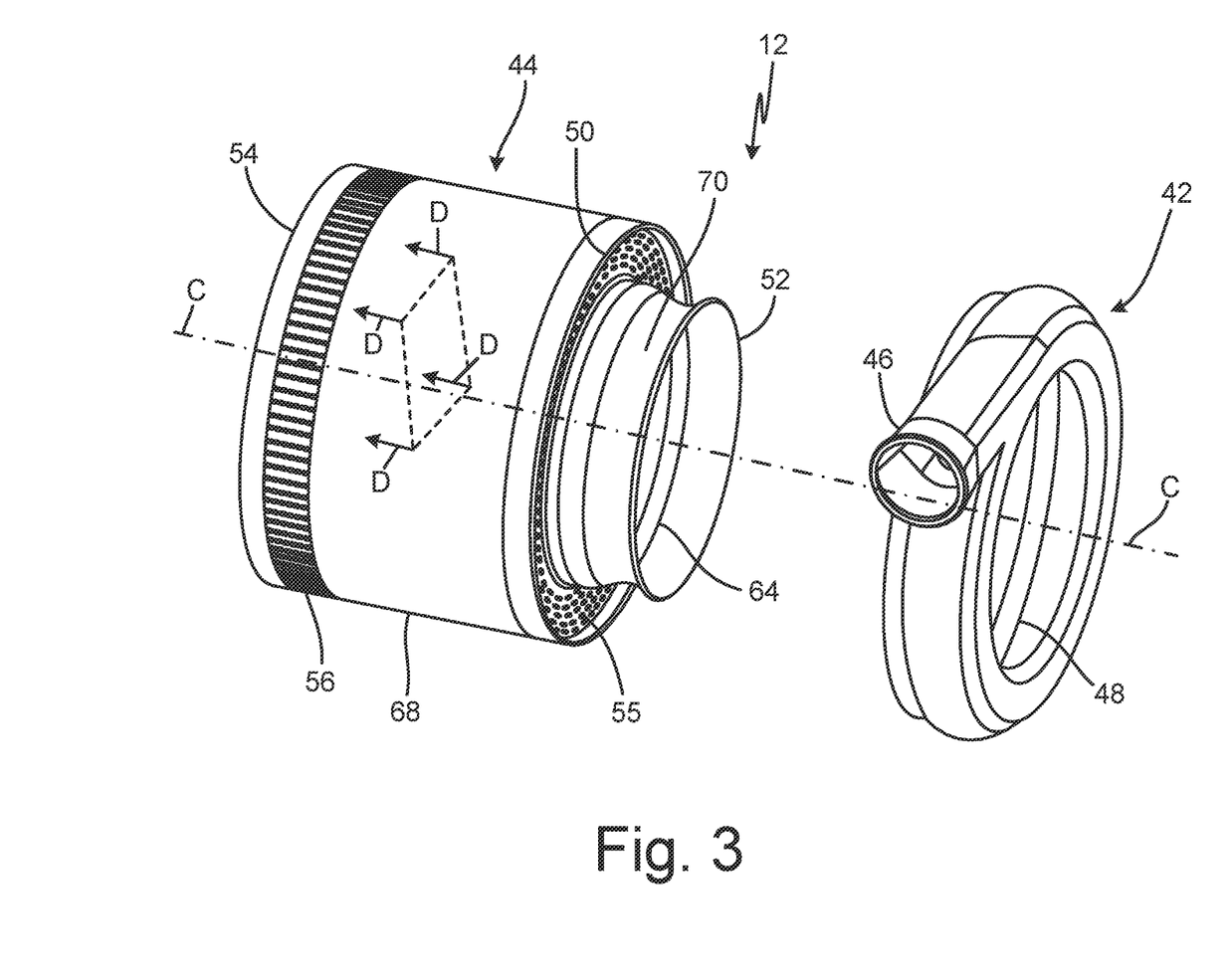
FIG. 3 is an exploded view of an annular heat exchanger.

For purposes of clarity and ease of discussion, FIGS. 2A, 2B, and 3 will be described together. FIG. 2A is a front isometric view of annular heat exchanger 12. FIG. 2B is a rear isometric view of annular heat exchanger 12. FIG. 3 is an exploded view of annular heat exchanger 12. Heat exchanger 12 includes hot inlet header 42 and core 44. Hot inlet header 42 includes port 46, and inner surface 48. Core 44 includes first end 50, standoff 52, second end 54, hot inlet trough 55, hot outlet 56, cold inlet 58, and cold outlet 60. ("Hot" and "cold" designations herein are used to refer to the relative temperature of fluid entering the heat exchanger at the hot and cold inlets, respectively, but the designations can be reversed in alternative embodiments.) Core 44 is defined by inner diameter 62 (which defines inner face 64) and outer diameter 66 (which defines outer face 68). Standoff 52 defines mating surface 70.

Core 44 is annular (or cylindrical) and centered about longitudinal axis C (as shown in FIG. 3). Core 44 can be made of thermally conductive material. In this embodiment, core 44 is made of an aluminum-silicon alloy. In other embodiments, core 44 can include other metallic or non-metallic materials, such as plastics, or any other suitable thermally conductive materials.

Core 44 extends radially from inner diameter 62 to outer diameter 66 with respect to axis C. Inner diameter 62 can be about 7 inches and outer diameter 66 can be about 10 inches. Therefore, the distance between inner diameter 62 and outer diameter 66 can be about 2 to 3 inches. Inner diameter 62 defines radially inner face 64 of core 44 and outer diameter 66 defines radially outer face 68 of core 44. Each of inner face 64 and outer face 68 is cylindrical and defines a generally circular cross-sectional area. Outer face 68 is a radially outer surface of core 44. In the axial direction, the main body of core 44 extends from first end 50 to second end 54. The distance between first end 50 and second end 54 can be about 6 to 7 inches. Inner face 64 of core 44 surrounds a central space or void that extends axially through core 44. Inner face 64 can mate with (i.e., connect to) or be integrated directly with the radial surfaces of other cylindrical components (e.g., water collector 28, first turbine 34, second turbine 38, and any other cylindrical components, such as rotating machines and additional heat exchangers, as shown above in FIG. 1).

Hot outlet 56 is a circumferential opening or band of openings into outer face 68 of core 44. Hot outlet is located distally from hot inlet header 42 and first end 50 of core 44. Hot outlet can be located proximate second end 54. Cold inlet 58 is a circumferential opening or band of openings into inner face 64 of core 44. Cold inlet 58 can be located distally from first end 50 and proximate second end 54. Cold inlet 58 can be located radially inward from hot outlet 56. Cold outlet 60 is a circumferential opening or band of openings into inner face 64 of core 44. Cold outlet 60 can be located proximate first end 50. As will be described in greater detail below with respect to FIGS. 4A and 4B, core 44 defines internal fluid passages extending between hot inlet trough 55 and hot outlet 56 and between cold inlet 58 and cold outlet 60.

Standoff 52 is an annular extension of inner face 64 of core 44. Standoff 52 is continuous with inner face 64 and extends past or beyond first end 50 to receive hot inlet header 42. The length that standoff 52 extends beyond first end 50 can be based on a size of hot inlet header 42. As shown in FIG. 3, standoff 52 can be contoured such that mating surface 70 is complementary to inner surface 48 of hot inlet header 42.

Figure 4A:
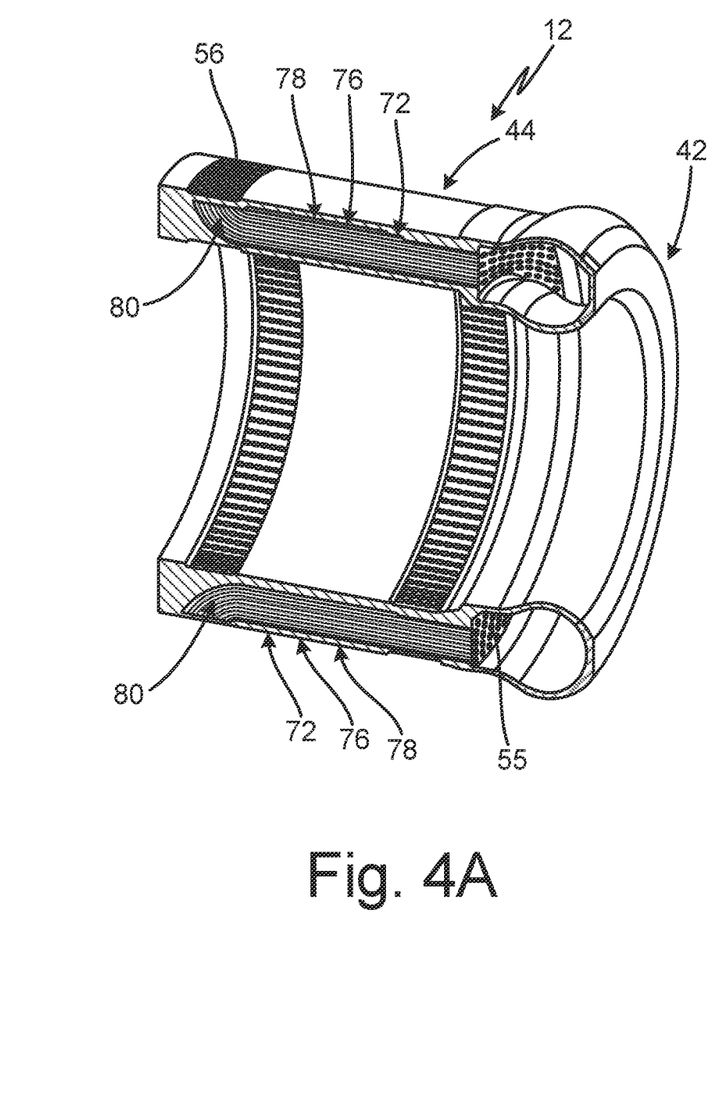
FIG. 4A is a cross-sectional view of an annular heat exchanger showing hot flow channels taken at plane A-A of FIG. 2A.
Figure 4B:
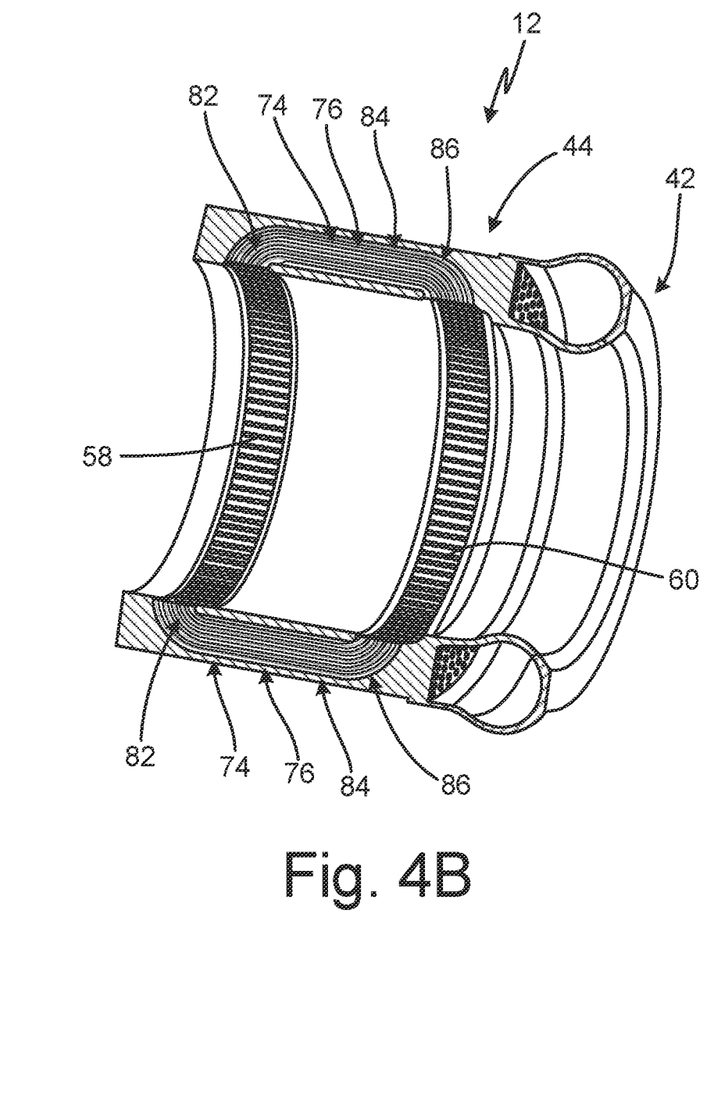
FIG. 4B is a cross-sectional view of an annular heat exchanger showing cold flow channels taken at plane B-B of FIG. 2B.
Figure 4C:
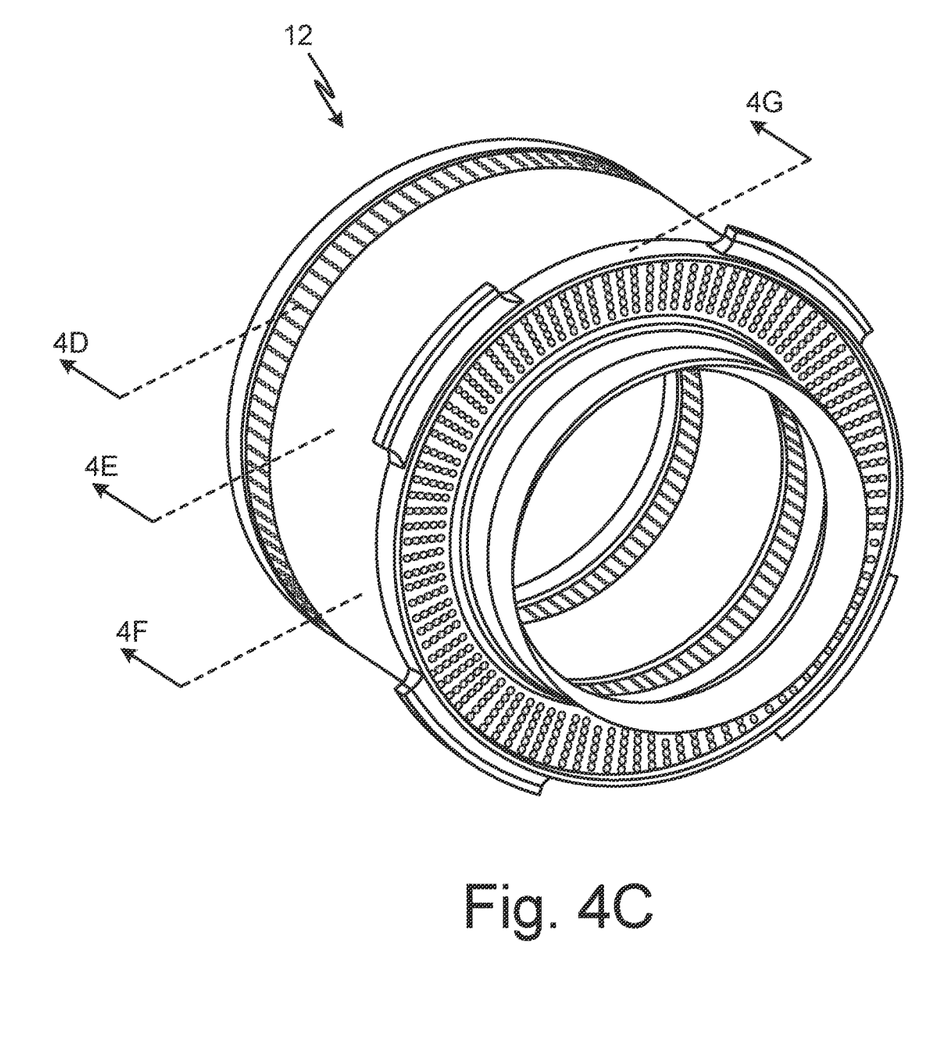
FIG. 4C is a cut-away isometric view of an annular heat exchanger.
Figure 4D:
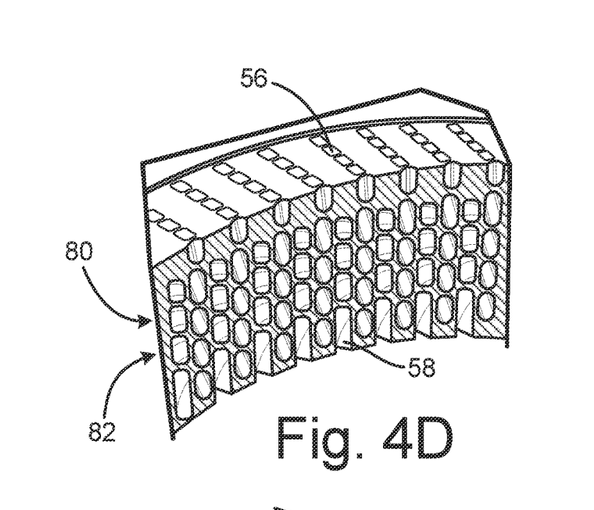
FIG. 4D is a partial cross-sectional view of an annular heat exchanger taken at location 4D of FIG. 4C.
Figure 4E:
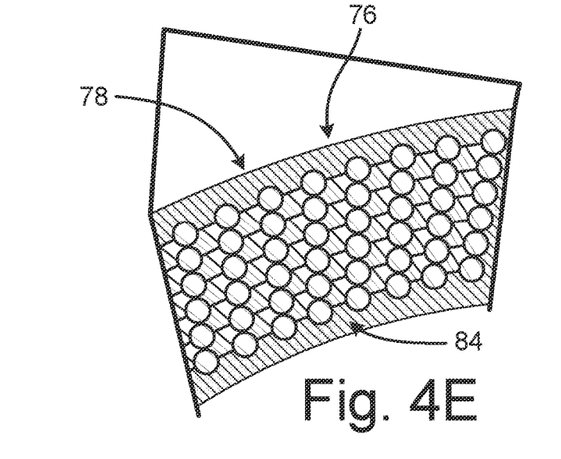
FIG. 4E is a partial cross-sectional view of an annular heat exchanger taken at location 4E of FIG. 4C.
Figure 4F:
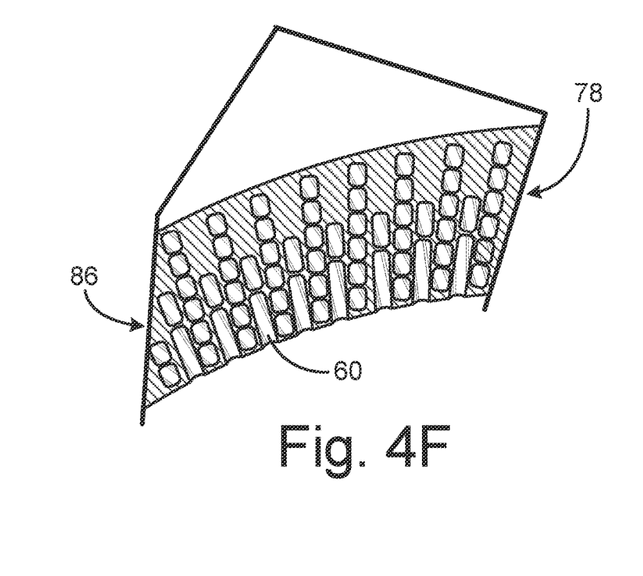
FIG. 4F is a partial cross-sectional view of an annular heat exchanger taken at location 4F of FIG. 4C.
Figure 4G:
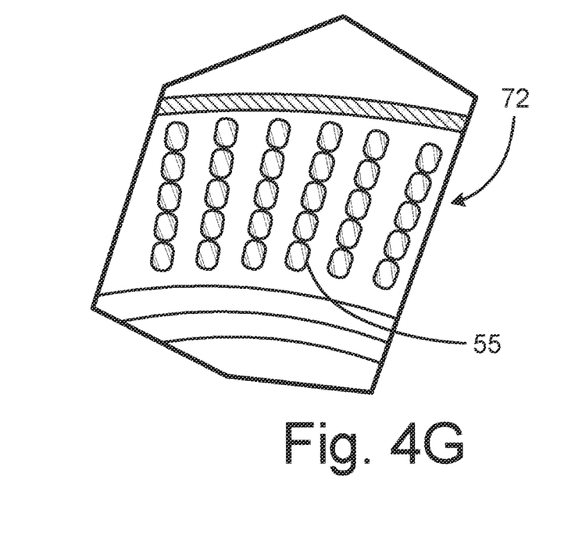
FIG. 4G is a partial cross-sectional view of an annular heat exchanger taken at location 4G of FIG. 4C.

Hot inlet header 42 is connected to core 44 at first end 50 of core 44. More specifically, hot inlet header 42 is positioned adjacent first end 50 and connected to mating surface 70 of standoff 52 at inner surface 48. Hot inlet header 42 can be welded to standoff 52, for example, at one or multiple corresponding locations along mating surface 70 and inner surface 48 (e.g., circumferential welds). Alternatively, core 44 does not include standoff 52 (not shown) and hot inlet header 42 is integral with and extends from first end 50 via inner face 64 and outer face 68. In the embodiment shown in FIGS. 2A-3, hot inlet header 42 is torus-shaped and centered about longitudinal axis C to align with annular core 44. In other embodiments, hot inlet header 42 can be any other suitable header geometry or configuration. Heat exchanger 12 can also include multiple headers interfacing with core 44 at first end 50. Hot inlet header 42 can be hollow (as shown in FIGS. 4A and 4B), and the end of hot inlet header 42 that is adjacent to first end 50 of core 44 can be open, such that the internal space within hot inlet header 42 is continuous with hot inlet trough 55 of core 44. In the embodiment shown in FIGS. 2A-3, port 46 extends tangentially from hot inlet header 42 and forms an opening into the interior of hot inlet header 42. In other embodiments, port 46 can extend from hot inlet header 42 at any angle or can be flush with the surface of hot inlet header 42. In yet other embodiments, hot inlet header 42 can include multiple ports 46 at multiple angles.

Hot inlet trough 55 is located proximate first end 50 of core 44. Hot inlet trough 55 is an opening or band of openings into core 44 spanning between inner diameter 62 and outer diameter 66. Hot inlet trough 55 can define an annular depression or indentation into the main body of core 44, such that outer face 68 extends past or beyond the surface of hot inlet trough 55 (i.e., outer face 68 can form a circumferential lip around hot inlet trough 55 at first end 50). Hot inlet trough 55 is covered by hot inlet header 42 and can be configured such that the openings of hot inlet trough 55 align with the open end of hot inlet header 42.

With continued reference to FIGS. 2A, 2B, and 3, heat exchanger 12 is configured to permit the transfer of heat between hot fluid $F_H$ and cold fluid $F_C$. For example, a transfer of heat can be associated with the use of hot fluid $F_H$ and/or cold fluid $F_C$ for cooling and/or lubrication of components in a larger system, such as an air cycle machine (ACM) of an aircraft environmental control system (ECS) or in a vapor-compression refrigeration system. Hot fluid $F_H$ and cold fluid $F_C$ can be any type of fluid, including air, water, lubricant, fuel, or another fluid. In an ACM embodiment, both hot fluid $F_H$ and cold fluid $F_C$ can be air. In a refrigeration system embodiment, hot fluid $F_H$ can be a refrigerant, such as tetrafluoroethane (R-134a), and cold fluid $F_C$ can be a liquid coolant, such as an ethylene glycol solution (EGW). Heat exchanger 12 is described herein as providing heat transfer from hot fluid $F_H$ to cold fluid $F_C$; therefore, hot fluid $F_H$ is at a greater temperature than cold fluid $F_C$ at the point where hot fluid $F_H$ enters heat exchanger 12. However, other configurations of heat exchanger 12 can include cold fluid $F_C$ at a greater temperature than hot fluid $F_C$ (and, thus, the "hot" and "cold" designations used herein would be reversed).

In the example of FIGS. 2A and 2B, heat exchanger 12 is shown receiving hot fluid $F_H$ at port 46 of hot inlet header 42, discharging hot fluid $F_H$ at hot outlet 56, receiving cold fluid $F_C$ at cold inlet 58, and discharging cold fluid $F_C$ at cold outlet 60 (i.e., a counter-flow arrangement). In other examples, the direction of flow of hot fluid $F_H$ and/or cold fluid $F_C$ can be reversed such that either of hot fluid $F_H$ or cold fluid $F_C$ can enter or exit heat exchanger 12 at any of port 46, hot outlet 56, cold inlet 58, or cold outlet 60. In yet other examples, heat exchanger 12 can be configured to interact with additional fluids, including along axes parallel or perpendicular to heat exchanger 12 (i.e., an additional counter-flow or a crossflow arrangement, respectively, not shown).

In operation, port 46 of hot inlet header 42 is configured to receive or discharge hot fluid $F_H$ directly from/to another component or duct. Hot fluid $F_H$ can enter heat exchanger 12 at port 46. Hot fluid $F_H$ flows through the torus-shaped hot inlet header 42 and is channeled from the openings at hot inlet trough 55, through core 44, to exit heat exchanger 12 at hot outlet 56. Cold inlet 58 is configured to receive or discharge cold fluid $F_C$ directly from/to another component or duct. Cold fluid $F_C$ can enter heat exchanger 12 at cold inlet 58. Cold fluid $F_C$ is channeled from the openings at cold inlet 58, through core 44, to exit heat exchanger 12 at cold outlet 60. In this embodiment, fluid can be transferred directly between heat exchanger 12 and other components, in particular, other cylindrical components, via port 46, hot outlet 56, cold inlet 58, and cold outlet 60. Heat transfer between hot fluid $F_H$ and cold fluid $F_C$ can occur largely at core 44.

Annular core 44 of heat exchanger 12 (and/or any component parts, including hot inlet header 42, or the entirety of heat exchanger 12) can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining unique geometries and for reducing the need for welds or other attachments (e.g., between segments of a core). However, it should be understood that other suitable manufacturing processes can be used.

During an additive manufacturing process, core 44 (and/or any component parts, including hot inlet header 42, or the entirety of heat exchanger 12) can be formed layer by layer to achieve various dimensions (e.g., cross-sectional area, wall thicknesses, curvature, etc.) and complex internal passages. Each additively manufactured layer creates a new horizontal build plane to which a subsequent layer of core 44 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, core 44 can be additively manufactured as a single, monolithic unit. Additive manufacturing can reduce cost, weight, and assembly time of heat exchanger 12.

Additional component parts of heat exchanger 12, such as hot inlet header 42, can be fabricated separately from core 44 using any suitable manufacturing process and then attached to core 44 post-manufacture (e.g., by welding). Separate fabrication of hot inlet header 42 can reduce requirements for internal support structures, which would otherwise need to be removed. The examples of FIGS. 2A-3 show heat exchanger 12 with core 44 already fully manufactured and attached to hot inlet header 42.

As described above with respect to FIG. 1, the annular configuration of heat exchanger 12 enables heat exchanger 12 to mate with or be integrated directly with the radial surfaces of other cylindrical components (e.g., rotating machines, additional heat exchangers, and water collectors). This configuration enables distributed flow to be ported directly into or out of mating component plenums with minimal need for additional collector plenums, external ducts, or couplings between heat exchanger 12 and other components. Therefore, system assembly weight and volume can be reduced. Furthermore, pressure losses (i.e., pressure drop) between mated components can be reduced. Accordingly, the techniques of this disclosure allow for heat exchanger 12 to have increased efficiency and to be manufactured more effectively compared to traditional heat exchanger configurations.

FIGS. 4A-5B will be described together. FIG. 4A is a cross-sectional view of annular heat exchanger 12 showing hot flow channels 72 taken at plane A-A of FIG. 2A. FIG. 4B is a cross-sectional view of annular heat exchanger 12 showing cold flow channels 74 taken at plane B-B of FIG. 2B. FIG. 4C is a cut-away isometric view of annular heat exchanger 12. FIGS. 4D, 4E, 4F, and 4G are partial cross-sectional views of annular heat exchanger 12 taken at locations 4D, 4E, 4F, and 4G of FIG. 4C, respectively. Heat exchanger 12 includes all of the features described above with respect to FIGS. 2A-3, and additionally includes hot flow channels 72, cold flow channels 74, and overlap region 76. Hot flow channels 72 include first axial region 78 and first curved region 80. Cold flow channels 74 include second curved region 82, second axial region 84, and third curved region 86.

Hot flow channels 72 define a plurality of internal (to core 44) fluid passages that extend from hot inlet trough 55 to hot outlet 56. Hot flow channels 72 are generally tubular and have open ends that can form the band of openings at hot inlet trough 55 (i.e., each opening at hot inlet trough 55 can be an inlet of an individual hot flow channel 72) and hot outlet 56 (i.e., each opening at hot outlet 56 can be an outlet of an individual hot flow channel 72). Hot flow channels 72 are also open to the internal space within hot inlet header 42 at hot inlet trough 55. As shown in FIG. 4A, each individual one of hot flow channels 72 can form a relatively straight path from hot inlet trough 55 through first axial region 78. At first axial region 78, hot flow channels 72 are generally arranged axially within core 44 with respect to axis C (FIG. 3). First curved region 80 of hot flow channels 72 is relatively downstream of first axial region 78. At first curved region 80, hot flow channels 72 can form a curved path to hot outlet 56. In the embodiment shown in FIG. 4A, hot flow channels 72 turn 90 degrees from first axial region 78 to hot outlet 56; however, it should be understood that in other examples, the angle of hot flow channels 72 at first curved region 80 can depend on the external shape of core 44 and need not be 90 degrees. Each individual one of hot flow channels 72 can have a circular cross-sectional area in both of first axial region 78 and first curved region 80.

Cold flow channels 74 define a plurality of internal (to core 44) fluid passages that extend from cold inlet 58 to cold outlet 60. Cold flow channels 74 are generally tubular and have open ends that can form the band of openings at cold inlet 58 (i.e., each opening at cold inlet 58 can be an inlet of an individual cold flow channel 74) and cold outlet 60 (i.e., each opening at cold outlet 60 can be an outlet of an individual cold flow channel 74). At second curved region 82, cold flow channels 74 can form a curved path extending from cold inlet 58 to second axial region 84. In the example of FIG. 4B, cold flow channels 74 turn 90 degrees from cold inlet 58 to second axial region 84; however, it should be understood that in other examples, the angle of cold flow channels 74 at second curved region 82 can depend on the external shape of core 44 and need not be 90 degrees. Second axial region 84 of cold flow channels 74 is relatively downstream of second curved region 82. As shown in FIG. 4B, each individual one of cold flow channels 74 can form a relatively straight path within second axial region 84. At second axial region 84, cold flow channels 74 are generally arranged axially within core 44 with respect to axis C (FIG. 3). Third curved region 86 of cold flow channels 74 is relatively downstream of second axial region 84. At third curved region 86, cold flow channels 74 can form a curved path to cold outlet 60. In the embodiment shown in FIG. 4B, cold flow channels 74 turn 90 degrees from second axial region 84 to cold outlet 60; however, it should be understood that in other examples, the angle of cold flow channels 74 at third curved region 86 can depend on the external shape of core 44 and need not be 90 degrees.

Each individual one of cold flow channels 74 can have a circular cross-sectional area in both of second curved region 82 and third curved region 86. Each individual one of cold flow channels 74 can have a contoured hexagonal cross-sectional area (as shown in greater detail in FIGS. 5A and 5B) in second axial region 84. Thus, at locations (not labeled) where cold flow channels 74 transition from second curved region 82 to second axial region 84 and from second axial region 84 to third curved region 86, the cross-sectional area of cold flow channels 74 can also transition from circular to contoured hexagonal and from contoured hexagonal to circular, respectively.

Second curved region 82 of cold flow channels 74 can overlap with first curved region 80 of hot flow channels 72, and third curved region 86 of cold flow channels 74 can overlap with a portion of first axial region 78 of hot flow channels 72 near hot inlet trough 55 (as is most easily viewed in FIG. 4A). Hot flow channels 72 and cold flow channels 74 are interleaved at overlap region 76. Overlap region 76 can correspond to first axial region 78 of hot flow channels 72 and second axial region 84 of cold flow channels 74. Overlap region 76 can also correspond to a portion of first curved region 80, second curved region 82, and third curved region 86 that is adjacent to first axial region 78 or second axial region 84, respectively, depending on where the curved paths of hot flow channels 72 and cold flow channels 74 cross (i.e., depending on the angle of hot flow channels 72 through first curved region 80 and cold flow channels 74 though second curved region 82 and third curved region 86). As will be described in greater detail below with respect to FIG. 5A, layers of hot flow channels 72 are spaced apart within overlap region 76 such that a layer of cold flow channels 74 can be disposed between two circumferentially consecutive layers of hot flow channels 72. Further, though the examples of FIGS. 4A and 4B show that each individual one of hot flow channels 72 and cold flow channels 74 is arranged in a straight path within overlap region 76, it should be understood that alternative core configurations are possible, including three-dimensional curved, branched, or separated regions within overlap region 76 (e.g., to allow other components, such as sensors or probes, to pass through core 44 without disrupting fluid flow).

Figure 5A:
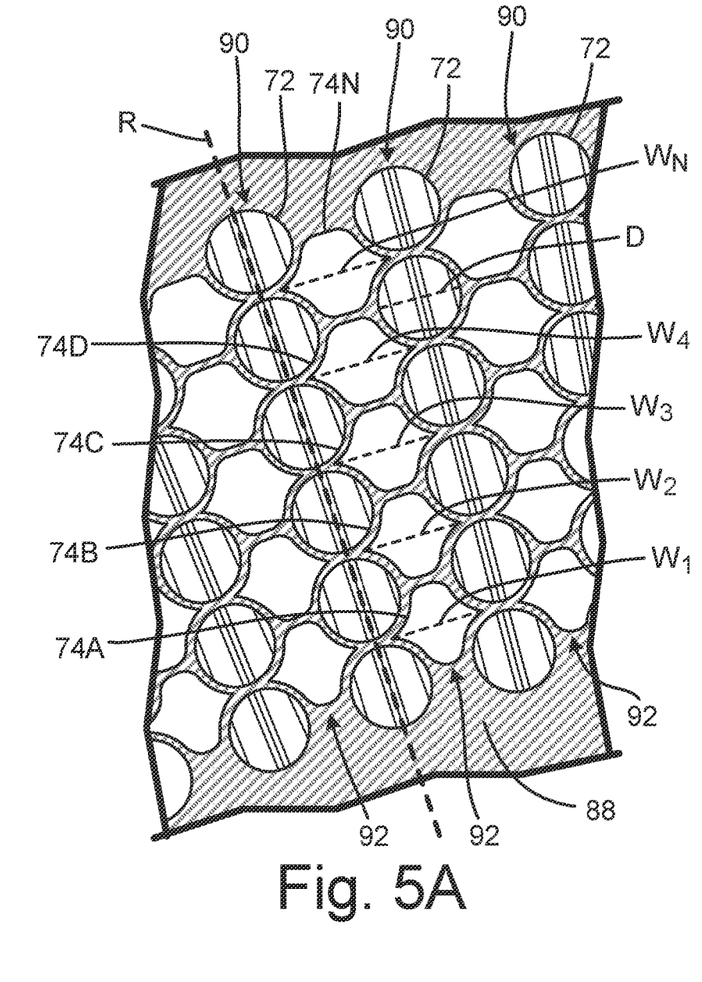
FIG. 5A is a partial cross-sectional view of an annular heat exchanger showing circumferentially interleaved layers of hot and cold flow channels taken at plane D-D of FIG. 3.
Figure 5B:
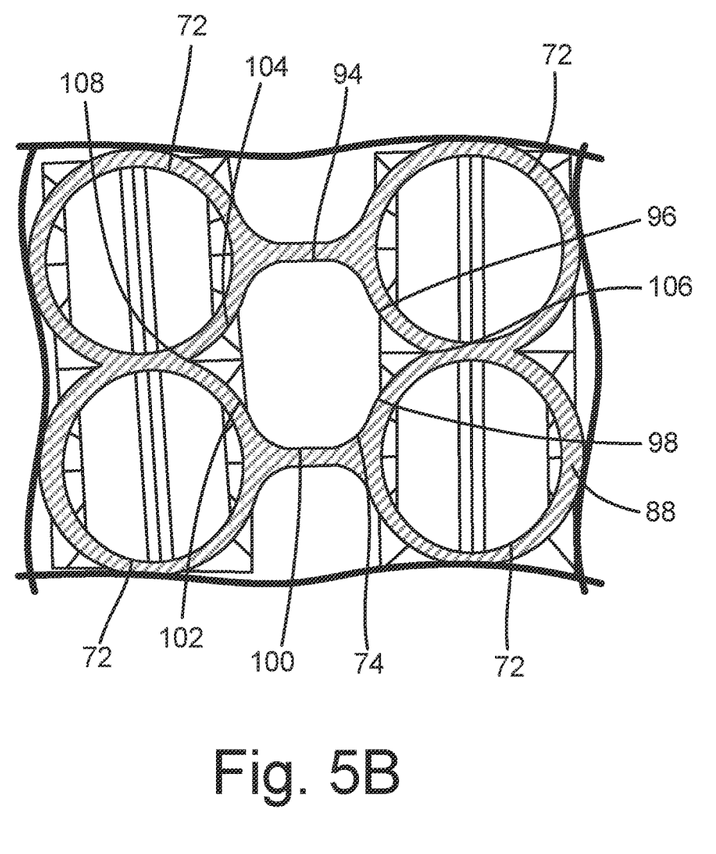
FIG. 5B is an enlarged partial cross-sectional view of hot and cold flow channels taken at plane D-D of FIG. 3.

The configuration and cross-sectional lattice geometry of core 44 is shown in greater detail in FIGS. 5A and 5B. FIG. 5A is a partial cross-sectional view of annular heat exchanger 12 showing circumferentially interleaved layers of hot and cold flow channels 72 and 74 taken at plane D-D of FIG. 3. FIG. 5B is an enlarged partial cross-sectional view of hot and cold flow channels 72 and 74 taken at plane D-D of FIG. 3. Heat exchanger 12 includes all of the features described above with respect to FIGS. 2A-4B, and additionally includes core wall 88, hot layers 90 of hot flow channels 72, and cold layers 92 of cold flow channels 74A-74N ("N" is used herein as an arbitrary integer). Hot flow channels 72 are defined by cross-sectional diameters D. Cold flow channels 74A-74N are defined by tangential widths $W_1$-$W_N$. Each cold flow channel 74A-74N further includes first side 94, second side 96, third side 98, fourth side 100, fifth side 102, sixth side 104, first apex 106, and second apex 108.

Each of hot flow channels 72 can have a circular cross-sectional area defined by cross-sectional diameter D. More specifically, each of hot flow channels 72 can have an equal cross-sectional diameter D. Hot flow channels 72 are arranged radially in hot layers 90 extending from inner diameter 62 to outer diameter 66 of core 44. Adjacent hot flow channels 72 are aligned such that core wall 88 forms a shared wall between each adjacent hot flow channel 72. Multiple hot flow channels 72 are aligned in this manner to form hot layers 90.

Cold flow channels 74A-74N are arranged radially in cold layers 92 extending from inner diameter 62 to outer diameter 66 of core 44 (FIG. 2B), such that cold flow channels 74A are the innermost cold flow channels with respect to inner diameter 62 and cold flow channels 74N are the outermost cold flow channels with respect to inner diameter 62. In this embodiment, a single cold layer 92 includes five individual cold flow channels 74A-74N (adjacent to six hot flow channels 72). Other embodiments can include any number of radially arranged cold flow channels 74A-74N per cold layer 92 and any number of hot flow channels 72 per hot layer 90.

Each of cold flow channels 74A-74N can have a contoured hexagonal cross-sectional area defined by corresponding tangential width $W_1$-$W_N$. More specifically, radially innermost cold flow channels 74A can have tangential width $W_1$ and radially outermost cold flow channels 74N can have tangential width $W_N$. Tangential widths $W_1$-$W_N$ can increase monotonically from $W_1$ to $W_N$ along radius R of core 44, such that innermost cold flow channels 74A are narrower than outermost cold flow channels 74N. Adjacent ones of cold flow channels 74A-74N are aligned such that core wall 88 forms a shared wall between each adjacent cold flow channel 74A-74N. Multiple cold flow channels 74A-74N are aligned in this manner to form cold layers 92.

Hot layers 90 are arranged alternately (i.e., circumferentially interleaved) with cold layers 92 to form the interleaved structure of overlap region 76 (FIGS. 4A and 4B). As shown in FIG. 5A, an adjacent pair of hot layers 90 and cold layers 92 can be offset by half of cross-sectional diameter D. Core wall 88 forms a lattice between adjacent hot layers 90 and cold layers 92. As is most easily viewed in FIG. 5B, individual cold flow channels 74 each can have a contoured hexagonal cross-sectional area that is closely aligned between the circular cross-sectional areas of adjacent ones of hot flow channels 72.

Specifically, this embodiment shows individual cold flow channels 74 are six-sided, with two substantially parallel flat sides and four concave sides. First side 94 connects to second side 96, second side 96 connects to third side 98, third side 98 connects to fourth side 100, fourth side 100 connects to fifth side 102, fifth side 102 connects to sixth side 104, and sixth side 104 connects to first side 94. First side 94 and fourth side 100 can be relatively flat. First side 94 can be adjacent a radially outward one of cold flow channels 74 within cold layer 92 (FIG. 5A), and fourth side 100 can be adjacent a radially inward one of cold flow channels 74 within cold layer 92. Each of second side 96, third side 98, fifth side 102, and sixth side 104 can be relatively concave to accommodate an arc of the circular cross-sectional area of an adjacent hot flow channel 72. Second side 96 and third side 98 meet at first apex 106 between two hot flow channels 72. Fifth side 102 and sixth side 104 meet at second apex 108 between two hot flow channels 72. Tangential widths $W_1$-$W_N$ are measured between opposing first apex 106 and second apex 108 of a given cold flow channel 74. It should be understood that the lengths, angles, and curvature of each of first side 94, second side 96, third side 98, fourth side 100, fifth side 102, and sixth side 104 can vary depending, for example, on the size of adjacent hot flow channels 72 or of core 44.

As described above with respect to FIGS. 2A-3, hot fluid $F_H$ can enter heat exchanger 12 at port 46 (FIG. 2A) of hot inlet header 42. Hot fluid $F_H$ flows through hot inlet header 42 and is channeled from the openings at hot inlet trough 55, through core 44, to exit heat exchanger 12 at hot outlet 56. Within core 44, hot fluid $F_H$ flows through hot flow channels 72 from first axial region 78 to first curved region 80. Cold fluid $F_C$ can enter heat exchanger 12 at cold inlet 58. Cold fluid $F_C$ is channeled from the openings at cold inlet 58, through core 44, to exit heat exchanger 12 at cold outlet 60. Within core 44, cold fluid $F_C$ flows through cold flow channels 74 from second curved region 82, through second axial region 84, to third curved region 86. Heat transfer between hot fluid $F_H$ and cold fluid $F_C$ can occur largely where hot flow channels 72 are interleaved with cold flow channels 74 at overlap region 76.

The contoured hexagonal cross-sectional area of cold flow channels 74 enables the annular configuration of core 44 of heat exchanger 12 while maximizing heat transfer surfaces between hot flow channels 72 and cold flow channels 74. Hot and cold flow channels 72 and 74 enable customized routing of passages within core 44 to efficiently meet mating interfaces (e.g., at cold inlet 58 and/or cold outlet 60 along inner diameter 62 and/or hot outlet 56 along outer diameter 66). Accordingly, the techniques of this disclosure allow for heat exchanger 12 to have increased efficiency and to be manufactured more effectively compared to traditional heat exchanger configurations.

Discussion of Possible Embodiments

The following are non-exclusive descriptions of possible embodiments of the present invention.

A heat exchanger includes a header and an annular core fluidly connected to the header. The annular core includes an inner diameter defining an inner face, an outer diameter defining an outer face, first flow channels arranged in a first set of layers between the inner diameter and the outer diameter, and second flow channels arranged in a second set of layers between the inner diameter and the outer diameter and interleaved with the first flow channels. Each of the first flow channels includes a first inlet, a first outlet, and a first axial region extending between the first inlet and the first outlet. Each of the second flow channels includes a second inlet, a second outlet, and a second axial region extending between the second inlet and the second outlet.

The heat exchanger of the preceding paragraph can optionally include, additionally and/or alternatively, any one or more of the following features, configurations, and/or additional components:

Each of the second flow channels can be defined by a tangential width at the second axial region, and the tangential widths can increase from an innermost one of the second set of layers to an outermost one of the second set of layers with respect to the inner diameter of the annular core.

The tangential widths can increase monotonically.

The first flow channels and the second flow channels can be generally tubular.

The first and second flow channels can form a lattice at the first and second axial regions such that, at the first axial region, each of the first flow channels can have a circular cross-sectional area defined by a cross-sectional diameter and, at the second axial region, each of the second flow channels can have a contoured cross-sectional area.

The cross-sectional diameters of the first flow channels can be equal.

The first outlet of each of the first flow channels can be positioned along the outer face of the annular core.

The second inlet of each of the second flow channels and the second outlet of each of the second flow channels can be positioned along the inner face of the annular core.

The first flow channels can be configured to receive or discharge a first fluid and the second flow channels can be configured to receive or discharge a second fluid.

The first fluid and the second fluid can flow through the heat exchanger in generally opposite directions, such that the heat exchanger can have a counter-flow arrangement.

The first fluid can be a relatively hot gas and the second fluid can be a relatively cold gas.

The heat exchanger can be a condenser.

The inner face of the heat exchanger can mate with a radial interface of an air cycle machine in an environmental control system.

The second inlet of each of the second flow channels and the second outlet of each of the second flow channels can be configured to permit direct fluid communication with components of the air cycle machine at the radial interface.

The annular core can be a single, monolithic, additively manufactured unit.

The annular core can further include a standoff that extends from the inner face, and the header can be connected to the annular core at the standoff.

The header can be welded to the standoff.

A method includes constructing an annular heat exchanger core as a single, monolithic unit utilizing an additive manufacturing process, constructing a heat exchanger header, and connecting the header to the annular core to form a heat exchanger. The annular core includes an inner diameter defining an inner face, an outer diameter defining an outer face, first flow channels arranged in a first set of layers between the inner diameter and the outer diameter, and second flow channels arranged in a second set of layers between the inner diameter and the outer diameter and interleaved with the first flow channels. Each of the first flow channels includes a first inlet, a first outlet, and a first axial region extending between the first inlet and the first outlet. Each of the second flow channels includes a second inlet, a second outlet, and a second axial region extending between the second inlet and the second outlet.

The method of the preceding paragraph can optionally include, additionally and/or alternatively, any one or more of the following features, configurations, operations, and/or additional components:

Each of the second flow channels can be defined by a tangential width at the second axial region, and the tangential widths can increase from an innermost one of the second set of layers to an outermost one of the second set of layers with respect to the inner diameter of the annular core.

The first and second flow channels can form a lattice at the first and second axial regions such that, at the first axial region, each of the first flow channels can have a circular cross-sectional area defined by a cross-sectional diameter and, at the second axial region, each of the second flow channels can have a contoured cross-sectional area.

The cross-sectional diameters of the first flow channels can be equal.

The second inlet of each of the second flow channels and the second outlet of each of the second flow channels can be positioned along the inner face of the annular core.

The first flow channels can be configured to receive or discharge a first fluid and the second flow channels can be configured to receive or discharge a second fluid.

The first fluid and the second fluid can flow through the heat exchanger in generally opposite directions, such that the heat exchanger can have a counter-flow arrangement.

The heat exchanger can be a condenser.

Constructing the annular core as the single, monolithic unit utilizing the additive manufacturing process can further include constructing the annular core from an aluminum-silicon alloy.

Connecting the header to the annular core to form the heat exchanger can further include welding the header to the annular core.

The method can further include mating the inner face of the heat exchanger with a radial interface of an air cycle machine in an environmental control system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a header; and
   an annular core fluidly connected to the header, the annular core comprising:
   an inner diameter defining a radially inner face;
   an outer diameter defining a radially outer face;
   first flow channels arranged in a first set of layers between the inner diameter and the outer diameter, each of the first flow channels comprising:
   a first inlet;
   a first outlet;
   a first axial region extending between the first inlet and the first outlet; and
   a first curved region between the first axial region and the first outlet; and
   second flow channels arranged in a second set of layers between the inner diameter and the outer diameter and interleaved with the first flow channels, each of the second flow channels comprising:
   a second inlet;
   a second outlet;
   a second axial region extending between the second inlet and the second outlet;
   a second curved region between the second inlet and the second axial region; and
   a third curved region between the second axial region and the second outlet;
   wherein each of the second flow channels has a first cross-sectional shape at the second curved region and the third curved region and a second cross-sectional shape at the second axial region.

2. The heat exchanger of claim 1,
wherein each of the second flow channels is defined by a tangential width at the second axial region, and the tangential widths increase from an innermost one of the second set of layers to an outermost one of the second set of layers with respect to the inner diameter of the annular core.

3. The heat exchanger of claim 2,
wherein the tangential widths increase monotonically.

4. The heat exchanger of claim 1,
wherein the first and second flow channels form a lattice at the first and second axial regions such that, at the first axial region, each of the first flow channels has a circular cross-sectional area defined by a cross-sectional diameter and, at the second axial region, each of the second flow channels has a contoured cross-sectional area.

5. The heat exchanger of claim 4,
wherein the cross-sectional diameters of the first flow channels are equal.

6. The heat exchanger of claim 1,
wherein the first outlet of each of the first flow channels is positioned along the radially outer face of the annular core.

7. The heat exchanger of claim 1,
wherein the second inlet of each of the second flow channels and the second outlet of each of the second flow channels are positioned along the radially inner face of the annular core.

8. The heat exchanger of claim 1,
wherein the first flow channels are configured to receive or discharge a first fluid and the second flow channels are configured to receive or discharge a second fluid; and
wherein the first fluid and the second fluid flow through the heat exchanger in generally opposite directions, such that the heat exchanger has a counter-flow arrangement.

9. The heat exchanger of claim 1,
wherein the heat exchanger is a condenser.

10. The heat exchanger of claim 1,
wherein the inner face of the heat exchanger mates with a radial interface of an air cycle machine in an environmental control system.

11. The heat exchanger of claim 10,
wherein the second inlet of each of the second flow channels and the second outlet of each of the second flow channels are configured to permit direct fluid communication with components of the air cycle machine at the radial interface.

12. The heat exchanger of claim 1, wherein the annular core is a single, monolithic, additively manufactured unit.

13. The heat exchanger of claim 1, wherein the annular core further comprises a standoff that extends from the inner face; and
wherein the header is connected to the annular core at the standoff.

14. The heat exchanger of claim 4, wherein the contoured cross-sectional area of each of the second flow channels is closely aligned between the circular cross-sectional areas of adjacent ones of the first flow channels.

15. The heat exchanger of claim 14, wherein the contoured cross-sectional area of each of the second flow channels is hexagonal and includes four concave sides each of which is shaped to accommodate an arc of the circular cross-sectional area of an adjacent one of the first flow channels.

16. A method comprising:
constructing an annular heat exchanger core as a single, monolithic unit utilizing an additive manufacturing process, the annular core comprising:
   an inner diameter defining a radially inner face;
   an outer diameter defining a radially outer face;
   first flow channels in a first set of layers between the inner diameter and the outer diameter, each of the first flow channels comprising:
      an inlet;
      an outlet;
      an axial region extending between the inlet and the outlet; and
      a first curved region between the first axial region and the first outlet; and
   second flow channels in a second set of layers between the inner diameter and the outer diameter and interleaved with the first flow channels, each of the second flow channels comprising:
      an inlet;
      an outlet;
      an axial region extending between the inlet and outlet;
      a second curved region between the second inlet and the second axial region; and
      a third curved region between the second axial region and the second outlet;
      wherein each of the second flow channels has a first cross-sectional shape at the second curved region and the third curved region and a second cross-sectional shape at the second axial region;
constructing a heat exchanger header; and
connecting the header to the annular core to form a heat exchanger.

17. The method of claim 16, wherein each of the second flow channels is defined by a tangential width in the axial region, and the tangential widths increase from an innermost one of the second set of layers to an outermost one of the second set of layers with respect to the inner diameter of the annular core.

18. The method of claim 16, wherein constructing the annular core as the single, monolithic unit utilizing the additive manufacturing process further comprises constructing the annular core from an aluminum-silicon alloy.

19. The method of claim 16, wherein connecting the header to the annular core to form the heat exchanger further comprises welding the header to the annular core.

20. The method of claim 16, further comprising:
mating the inner face of the heat exchanger with a radial interface of an air cycle machine in an environmental control system.

* * * * *